(12) United States Patent
Barnes et al.

(10) Patent No.: US 8,423,408 B1
(45) Date of Patent: Apr. 16, 2013

(54) DYNAMIC ADVERTISING CONTENT DISTRIBUTION AND PLACEMENT SYSTEMS AND METHODS

(75) Inventors: James D. Barnes, Overland Park, KS (US); Sanjay K. Sharma, Olathe, KS (US); Peter H. Distler, Overland Park, KS (US); Robert E. Urbanek, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 43 days.

(21) Appl. No.: 11/405,195

(22) Filed: Apr. 17, 2006

(51) Int. Cl.
*G06F 15/173* (2006.01)
*H04M 3/42* (2006.01)
*H04Q 7/20* (2006.01)

(52) U.S. Cl.
USPC ............... 705/14.49; 705/14.41; 709/224; 455/414.2; 455/456.1

(58) Field of Classification Search ............ 705/10, 705/14, 26, 27, 14.41, 14.49; 709/224; 455/414.2, 455/456.1
See application file for complete search history.

(56) References Cited

U.S. PATENT DOCUMENTS

| | | | |
|---|---|---|---|
| 5,636,346 A | 6/1997 | Saxe | |
| 5,761,648 A | 6/1998 | Golden et al. | |
| 5,848,396 A | 12/1998 | Gerace | |
| 5,848,397 A * | 12/1998 | Marsh et al. | 705/14 |
| 5,918,014 A | 6/1999 | Robinson | |
| 5,918,041 A | 6/1999 | Berstis | |
| 5,933,811 A | 8/1999 | Angles et al. | |
| 5,937,392 A | 8/1999 | Alberts | |
| 5,974,398 A | 10/1999 | Hanson et al. | |
| 6,202,023 B1 | 3/2001 | Hancock et al. | |
| 6,233,566 B1 | 5/2001 | Levine et al. | |
| 6,266,649 B1 | 7/2001 | Linden et al. | |
| 6,286,005 B1 | 9/2001 | Cannon | |
| 6,317,722 B1 | 11/2001 | Jacobi et al. | |
| 6,321,983 B1 | 11/2001 | Katayanagi et al. | |
| 6,332,127 B1 | 12/2001 | Bandera et al. | |
| 6,826,575 B1 | 11/2004 | Waclawski | |
| 6,834,266 B2 | 12/2004 | Kumar et al. | |
| 6,839,680 B1 | 1/2005 | Liu et al. | |
| 6,853,982 B2 | 2/2005 | Smith et al. | |
| 6,910,017 B1 | 6/2005 | Woo et al. | |
| 6,963,867 B2 | 11/2005 | Ford et al. | |
| 6,966,536 B2 | 11/2005 | Enomoto et al. | |
| 6,990,462 B1 | 1/2006 | Wilcox et al. | |
| 7,022,905 B1 | 4/2006 | Hinman et al. | |
| 7,065,532 B2 | 6/2006 | Elder et al. | |
| 7,096,194 B2 | 8/2006 | Johnson | |
| 7,127,313 B2 | 10/2006 | Neri | |
| 7,143,143 B1 | 11/2006 | Thompson | |

(Continued)

OTHER PUBLICATIONS

Lightningcast, Inc., "Lightningcast Mobile Video Advertising Solution," May 2, 2005, 14 pgs.

(Continued)

*Primary Examiner* — John Weiss
*Assistant Examiner* — Marilyn G Macasiano (57) ABSTRACT

A method of dynamic content distribution and placement of advertising between a mobile device and an advertisement fulfillment system comprising providing a rotation of advertisements stored in the mobile device. Each advertisement comprises substantive content and a value in an impression field. The method further comprises selecting an advertisement from the rotation of advertisements based at least in part on which advertisement in the rotation was last displayed, and displaying the selected advertisement.

20 Claims, 7 Drawing Sheets

U.S. PATENT DOCUMENTS

| | | | |
|---|---|---|---|
| 7,251,615 B2 | 7/2007 | Woo | |
| 7,284,033 B2 | 10/2007 | Jhanji | |
| 7,353,267 B1* | 4/2008 | Cunningham et al. | 709/224 |
| 7,406,436 B1 | 7/2008 | Reisman | |
| 7,437,308 B2 | 10/2008 | Kumar et al. | |
| 7,481,367 B2 | 1/2009 | Fees et al. | |
| 7,647,258 B2 | 1/2010 | William et al. | |
| 7,676,394 B2 | 3/2010 | Ramer et al. | |
| 7,788,644 B2 | 8/2010 | Koduru et al. | |
| 7,840,498 B2 | 11/2010 | Frank et al. | |
| 7,958,005 B2 | 6/2011 | Dangaltchev | |
| 7,974,616 B1 | 7/2011 | Urbanek | |
| 8,326,673 B1 | 12/2012 | Biere et al. | |
| 2001/0039500 A1 | 11/2001 | Johnson | |
| 2001/0044743 A1 | 11/2001 | McKinley et al. | |
| 2001/0047294 A1* | 11/2001 | Rothschild | 705/14 |
| 2002/0010627 A1 | 1/2002 | Lerat | |
| 2002/0013727 A1* | 1/2002 | Lee | 705/14 |
| 2002/0026355 A1* | 2/2002 | Mitsuoka et al. | 705/14 |
| 2002/0026361 A1* | 2/2002 | Blom | 705/14 |
| 2002/0030100 A1 | 3/2002 | Katayanagi et al. | |
| 2002/0032771 A1* | 3/2002 | Gledje | 709/224 |
| 2002/0035474 A1 | 3/2002 | Alpdemir | |
| 2002/0059387 A1* | 5/2002 | Wolfe | 709/206 |
| 2002/0060246 A1 | 5/2002 | Gobburu et al. | |
| 2002/0065713 A1 | 5/2002 | Awada et al. | |
| 2002/0091569 A1 | 7/2002 | Kitaura et al. | |
| 2002/0091571 A1 | 7/2002 | Thomas et al. | |
| 2002/0095333 A1 | 7/2002 | Jokinen et al. | |
| 2002/0107027 A1* | 8/2002 | O'Neil | 455/456 |
| 2002/0128904 A1* | 9/2002 | Carruthers et al. | 705/14 |
| 2002/0128908 A1 | 9/2002 | Levin et al. | |
| 2002/0143630 A1 | 10/2002 | Steinman et al. | |
| 2002/0152133 A1 | 10/2002 | King et al. | |
| 2002/0184080 A1 | 12/2002 | Murad et al. | |
| 2003/0004802 A1 | 1/2003 | Callegari | |
| 2003/0004808 A1 | 1/2003 | Elhaoussine et al. | |
| 2003/0018516 A1 | 1/2003 | Ayala et al. | |
| 2003/0018558 A1 | 1/2003 | Heffner et al. | |
| 2003/0028451 A1 | 2/2003 | Ananian | |
| 2003/0050863 A1* | 3/2003 | Radwin | 705/27 |
| 2003/0074251 A1 | 4/2003 | Kumar et al. | |
| 2003/0074259 A1 | 4/2003 | Slyman, Jr. et al. | |
| 2003/0101024 A1 | 5/2003 | Adar et al. | |
| 2003/0101449 A1 | 5/2003 | Bentolila et al. | |
| 2003/0126250 A1 | 7/2003 | Jhanji | |
| 2003/0171962 A1 | 9/2003 | Hirth et al. | |
| 2003/0172007 A1 | 9/2003 | Helmolt et al. | |
| 2003/0229502 A1 | 12/2003 | Woo | |
| 2004/0019540 A1 | 1/2004 | William et al. | |
| 2004/0019541 A1 | 1/2004 | William et al. | |
| 2004/0111315 A1 | 6/2004 | Sharma et al. | |
| 2005/0021403 A1 | 1/2005 | Ozer et al. | |
| 2005/0028188 A1 | 2/2005 | Latona et al. | |
| 2005/0101332 A1 | 5/2005 | Kotzin | |
| 2005/0102272 A1 | 5/2005 | Kumar et al. | |
| 2005/0114829 A1 | 5/2005 | Robin et al. | |
| 2005/0177419 A1 | 8/2005 | Choi et al. | |
| 2005/0193036 A1 | 9/2005 | Phillips et al. | |
| 2005/0194431 A1 | 9/2005 | Fees et al. | |
| 2005/0197887 A1 | 9/2005 | Zuerl et al. | |
| 2005/0197918 A1 | 9/2005 | Wittmer et al. | |
| 2005/0215238 A1* | 9/2005 | Macaluso | 455/414.1 |
| 2005/0228754 A1 | 10/2005 | Pezzaniti et al. | |
| 2005/0246394 A1 | 11/2005 | Neri | |
| 2005/0256759 A1 | 11/2005 | Acharya et al. | |
| 2005/0278296 A1 | 12/2005 | Bostwick | |
| 2006/0080135 A1 | 4/2006 | Frank et al. | |
| 2006/0080171 A1 | 4/2006 | Jardins et al. | |
| 2006/0085253 A1 | 4/2006 | Mengerink et al. | |
| 2006/0085517 A1 | 4/2006 | Kaurila | |
| 2006/0141428 A1 | 6/2006 | Herrod et al. | |
| 2006/0224437 A1 | 10/2006 | Gupta et al. | |
| 2007/0005647 A1 | 1/2007 | Cugi et al. | |
| 2007/0026871 A1 | 2/2007 | Wager | |
| 2007/0061229 A1* | 3/2007 | Ramer et al. | 705/35 |
| 2007/0100963 A1 | 5/2007 | Ban et al. | |
| 2007/0106520 A1 | 5/2007 | Akkiraju et al. | |
| 2007/0130005 A1 | 6/2007 | Jaschke | |
| 2007/0192715 A1 | 8/2007 | Kataria et al. | |
| 2007/0198339 A1 | 8/2007 | Shen et al. | |
| 2007/0208619 A1 | 9/2007 | Branam et al. | |
| 2007/0239518 A1 | 10/2007 | Chung et al. | |
| 2008/0004884 A1 | 1/2008 | Flake et al. | |
| 2008/0082412 A1 | 4/2008 | Tallyn et al. | |
| 2008/0104637 A1 | 5/2008 | Rodriguez et al. | |
| 2008/0126515 A1 | 5/2008 | Chambers et al. | |
| 2008/0147478 A1 | 6/2008 | Mall et al. | |
| 2008/0228583 A1 | 9/2008 | MacDonald et al. | |
| 2009/0222329 A1* | 9/2009 | Ramer et al. | 705/10 |
| 2011/0131109 A1 | 6/2011 | Pappas et al. | |

OTHER PUBLICATIONS

Patent Application entitled, "Method and System Using Location History for Targeted Coupon Distribution," by Von K. McConnell, et al., filed May 17, 2000 as U.S. Appl. No. 09/572,282.

Patent Application entitled, "Systems and Methods for State-Based Advertisement Messaging Across Media Types," by James D. Barnes, et al., filed May 22, 2006 as U.S. Appl. No. 11/438,540.

Patent Application entitled, "Inventory Management Integrating Subscriber and Targeting Data," by James D. Barnes, et al., filed Jun. 26, 2006 as U.S. Appl. No. 11/474,880.

Patent Application entitled, "Method and System for Providing Custom Background-Downloads," by Geoff S. Martin, et al., filed Nov. 16, 2007 as U.S. Appl. No. 11/280,576.

Office Action dated Nov. 14, 2008, U.S. Appl. No. 11/474,880, filed Jun. 26, 2006, 17 pages.

Office Action dated Nov. 3, 2008, U.S. Appl. No. 11,438,540, filed May 22, 2006, 14 pages.

Final Office Action dated Apr. 20, 2010, U.S. Appl. No. 11/438,540, filed May 22, 2006, 26 pages.

Advisory Action dated Jul. 2, 2010, U.S. Appl. No. 11/438,540, filed May 22, 2006, 4 pages.

Office Action dated Mar. 5, 2010, U.S. Appl. No. 11/474,880, filed Jun. 26, 2006, 24 pages.

Patent Application entitled, "Mobile-Device-Based Coupon Management Systems and Methods," by James D. Barnes, et al., filed Apr. 13, 2006 as U.S. Appl. No. 11/403,614.

Patent Application entitled, "Subscriber Data Insertion Into Advertisements Requests," by James D. Barnes, et al., filed Jul. 21, 2006 as U.S. Appl. No. 11/491,387.

Patent Application entitled, "In-Flight Campaign Optimization," by James D. Barnes, et al., filed Nov. 9, 2006 as U.S. Appl. No. 11/558,021.

Patent Application entitled, "Carrier Data Bassed Product Inventory Management and Marketing," by James D. Barnes, et al., filed Dec. 28, 2006 as U.S. Appl. No. 11/617,703.

Patent Application entitled, "Advertisement Inventory Management," by James D. Barnes, et al., filed Oct. 27, 2008 as U.S. Appl. No. 12/259,187.

Office Action dated Feb. 4, 2009, U.S. Appl. No. 11/491,387, filed Jul. 21, 2006, 9 pages.

Final Office Action dated Aug. 6, 2009, U.S. Appl. No. 11/491,387, filed Jul. 21, 2006, 13 pages.

Advisory Action dated Oct. 19, 2009, U.S. Appl. No. 11/491,387, filed Jul. 21, 2006, 4 pages.

Office Action dated Jan. 6, 2010, U.S. Appl. No. 11/558,021, filed Nov. 9, 2006, 7 pages.

Final Office Action dated Jun. 29, 2010, U.S. Appl. No. 11/558,021, filed Nov. 9, 2006, 28 pages.

Final Office Action dated Aug. 18, 2010, U.S. Appl. No. 11/474,880, filed Jun. 26, 2006, 20 pages.

Office Action dated Aug. 30, 2010, U.S. Appl. No. 11/557,939, filed Nov. 8, 2006, 52 pages.

Advisory Action dated Sep. 22, 2010, U.S. Appl. No. 11/558,021, filed Nov. 9, 2006, 3 pages.

Patent application entitled "Method and System for Facilitating Determination of Call-Drop Locations in a Wireless Network," filed Sep. 9, 2003, as U.S. Appl. No. 10/658,353.

Patent Application entitled, "Communication Device Usage Event Profiling," by Robert E Urbanek, filed Jun. 8, 2006 as U.S. Appl. No. 11/449,078.

Patent application entitled "Seamless Retrieval of Non-Standard Items for a Mobile Device," filed May 12, 2006, as U.S. Appl. No. 11/433,301.

Patent application entitled "Mobile-Device-Based Coupon Management Systems and Methods," filed Apr. 13, 2006, as U.S. Appl. No. 11/403,614.

Patent Application entitled, "Behavioral Analysis Engine for Profiling Wireless Subscribers," by James D. Barnes, et al., filed Nov. 8, 2006 as U.S. Appl. No. 11/557,939.

Office Action dated Feb. 27, 2009, U.S. Appl. No. 11/433,301, filed May 12, 2006, 13 pages.

Notice of Allowance dated Oct. 26, 2009, U.S. Appl. No. 11/433,301, filed May 12, 2006, 7 pages.

Office Action dated Jun. 17, 2008, U.S. Appl. No. 11/403,614, filed Apr. 13, 2006, 7 pages.

Office Action dated Aug. 27, 2008, U.S. Appl. No. 11/403,614, filed Apr. 13, 2006, 11 pages.

Final Office Action dated Mar. 4, 2009, U.S. Appl. No. 11/403,614, filed Apr. 13, 2006, 12 pages.

Advisory Action dated May 7, 2009, U.S. Appl. No. 11/403,614, filed Apr. 13, 2006, 3 pages.

Office Action dated Aug. 20, 2009, U.S. Appl. No. 11/403,614, filed Apr. 13, 2006, 11 pages.

Office Action dated Apr. 28, 2009, U.S. Appl. No. 11/438,540, filed May 22, 2006, 16 pages.

Office Action dated Jul. 10, 2009, U.S. Appl. No. 11/438,540, filed May 22, 2006, 3 pages.

Office Action dated Oct. 16, 2009, U.S. Appl. No. 11/438,540, filed May 22, 2006, 12 pages.

Final Office Action dated May 28, 2009, U.S. Appl. No. 11/474,880, filed Jun. 26, 2006, 23 pages.

Advisory Action dated Oct. 19, 2009, U.S. Appl. No. 11/474,880, filed Jun. 26, 2006, 4 pages.

Advisory Action (corrected) dated Oct. 27, 2009, U.S. Appl. No. 11/474,880, filed Jun. 26, 2006, 4 pages.

Office Action dated Oct. 14, 2010, U.S. Appl. No. 11/438,540, filed May 22, 2006.

Office Action dated Sep. 30, 2010, U.S. Appl. No. 11/617,703, filed Dec. 28, 2006.

Final Office Action dated Jan. 13, 2011, U.S. Appl. No. 11/557,939, filed Nov. 8, 2006.

Final Office Action dated Nov. 8, 2010, U.S. Appl. No. 11/403,614, filed Apr. 13, 2006.

Examiner's Answer dated Nov. 8, 2010, U.S. Appl. No. 11/491,387, filed Jul. 21, 2006.

Final Office Action dated Mar. 30, 2011, U.S. Appl. No. 11/438,540, filed May 22, 2006.

Office Action dated Mar. 30, 2011, U.S. Appl. No. 11/474,880, filed Jun. 26, 2006.

Advisory Action dated Mar. 22, 2011, U.S. Appl. No. 11/557,939, filed Nov. 8, 2006.

Final Office Action dated Mar. 25, 2011, U.S. Appl. No. 11/617,703, filed Dec. 28, 2006.

Advisory Action dated Jun. 7, 2011, U.S. Appl. No. 11/617,703, filed Dec. 28, 2006.

Final Office Action dated Sep. 7, 2011, U.S. Appl. No. 11/474,880, filed Jun. 26, 2006.

Office Action dated Jul. 21, 2011, U.S. Appl. No. 12/259,187, filed Oct. 27, 2008.

Patent Application entitled "Seamless Retrieval of Non-Standard Items for a Mobile Device," by James D. Barnes, et al., filed Jan. 12, 2010, as U.S. Appl. No. 12/686,188.

Examiner's Answer dated Oct. 27, 2011, U.S. Appl. No. 11/438,540, filed May 22, 2006.

Advisory Action dated Nov. 15, 2011, U.S. Appl. No. 11/474,880, filed Jun. 26, 2006.

Final Office Action dated Dec. 12, 2011, U.S. Appl. No. 12/259,187, filed Oct. 27, 2008.

Notice of Allowance dated Aug. 1, 2012, U.S. Appl. No. 11/617,703, filed Dec. 28, 2006.

Connelly, Francis J., et al., "The Life Cycle Concept as a Long Term Forecasting Model", Academy of Marketing Journal (pre-1986); pp. 455-464, Summer 1974, 2, 3, ABI/INFORM Global.

Fisher, Marshall, et al., Accurate Retail Testing of Fashion Mechandise: Methodology and Application, Marketing Science, vol. 19, No. 3, pp. 266-278, Summer 2000, ABI/INFORM Global.

Kurawarwala, Abbas A., et al., "Forecasting and Inventory Management of Short Life-Cyle Products", Operations Research, vol. 44, No. 1, Jan.-Feb. 1996, pp. 131-150, INFORMS.

Stratman, Scott, "Allstockedup", Industrial Distribution, vol. 89, No. 11, Nov. 2000, pp. 92-96, ABI/INFORM Global.

Vijayan, Jaikumar, "IBM Service Follows Products After Delivery", Computerworld, vol. 35, No. 28, p. 14, Jul. 9, 2001, ABI/INFORM Global.

Examiner's Answer dated May 1, 2012, U.S. Appl. No. 11/474,880, filed Jun. 26, 2006.

Advisory Action dated Feb. 29, 2012, U.S. Appl. No. 12/259,187, filed Oct. 27, 2008.

Office Action dated Dec. 3, 2012, U.S. Appl. No. 11/403,614, filed on Apr. 13, 2006.

* cited by examiner

DYNAMIC ADVERTISING CONTENT DISTRIBUTION AND PLACEMENT SYSTEMS AND METHODS

CROSS-REFERENCE TO RELATED APPLICATIONS

This application includes subject matter related to the following applications, each of which is hereby incorporated by reference:

U.S. patent application Ser. No. 11/438,540, filed May 22, 2006, entitled "Systems and Methods for State Based Advertisement Messaging Across Media Types," by James Barnes, et al.

BACKGROUND

Advertising and marketing executives are constantly focused on reaching customers in new and innovative ways. With the widespread use of wireless communication devices and continuous advances in handset technology, previously untapped new avenues of advertising are becoming readily available. Because of the breadth of varying technology in handsets, the many types of media, and the lack of infrastructure to support advertising in the wireless world (compared to, for example, the internet or television advertising), tools in the form of both software and hardware are needed to most efficiently and effectively manage advertising content and campaigns in the new mobile avenues for advertising.

Advertising may be displayed in a splash screen of a wireless device. A splash screen is displayed and used by an application or operating system to notify the user that the application or operating system is in the process of loading. When used for advertising, the splash screen utilizes downtime while a program loads for advertising purposes. The splash screen then disappears when the application's main window appears. Splash screens may be visually appealing, and may also have animations, graphics and sound.

Some carriers use splash screens in wireless devices to display a static logo or brand to the user while, for instance, the device powers up and its operating system loads. The logo or brand displayed does not change, and is not targeted to the user or location of the device.

SUMMARY

Systems and methods for dynamic advertising content distribution and placement are provided. Some method embodiments include providing a rotation of advertisements stored in a mobile device, each advertisement comprising content and a value in an impression field. Then an advertisement is selected from the rotation of advertisements based at least in part on which advertisement in the rotation was last displayed and displayed.

According to some system embodiments, a system includes a mobile device and an advertisement fulfillment system. The mobile device includes an advertisements store that stores at least one advertisement and an advertisement management system that manages the advertisements store to present the advertisement to a user to dynamically change which advertisement in the rotation is presented to a user. The advertisement fulfillment system includes a campaign execution unit that executes the one or more advertising campaigns by transferring at least one advertisement for one or more advertising campaigns to the rotation in the advertisements store of the mobile device.

According to some embodiments, a mobile device for dynamic advertising content distribution and placement is provided. The mobile device includes an advertisements store that stores a rotation of advertisements delivered from an external source. The mobile device also includes an advertisement management system that manages the advertisements store to dynamically change which advertisement in the rotation is presented to a user. The mobile device also includes at least one executable application operable to present the advertisements to a user.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

DETAILED DESCRIPTION

It should be understood at the outset that although an illustrative implementation of various embodiments is provided below, the present system may be implemented using any number of techniques, whether currently known or not yet in existence. The present disclosure should in no way be limited to the illustrative implementations, drawings, and techniques illustrated below.

I. Overview

With new avenues of advertising in the mobile device environment opening, the systems and methods of the present disclosure provide an infrastructure for implementing and managing advertising campaigns. The mobile device of the present disclosure provides the hardware and software for retrieving advertising content from the advertisement fulfillment system, and for dynamically rotating the advertising content that is presented to the user of the mobile device. Finally, the methods of the present disclosure provide means for transferring advertising content to mobile devices for advertisement campaigns, dynamic placement and rotation of advertising content, and data mining and analytics based on the rotation and placement of the advertising content.

The following disclosure is divided into six sections including this overview. Section II defines terminology used in this disclosure. Section III describes in detail a novel advertising framework that provides context and support for the dynamic placement methods disclosed in the remaining sections IV through VI.

Terminology

As used herein, the term "Carrier" refers to a telecommunications company that provides communication services for a mobile device under a subscriber agreement.

As used herein, the term "Publisher" refers to the companies that provide the mechanism to display advertisements. For example, a publisher could be a WAP content provider, a Multi-media content provider, or a JAVA application provider. Specifically, Publishers are content providers.

As used herein, the term "pricing" refers to the process of rating advertisements to determine the price of running a given advertisement at a particular time, in a particular application, and the like.

As used herein, the term "impressions" refers to the number of instances that any given advertisement has been displayed, or is desired to be displayed by the mobile device.

As used herein, the term "spots" refers to an available instance in an application, splash screen or white space in which an advertisement may be displayed. A spot, in this context of advertising in a mobile device, is analogous to the use of the term "spot" to refer to an available instance for a commercial on television or radio between major programs. Just as "spots" may be sold for advertising on television during the a sporting event such as the Superbowl or during a popular program, spots may be sold for advertising in applications, white spaces, and splash screens in a mobile device.

As used herein, the term "targeting information" refers to input criteria that identify an individual or group of individual mobile device users that are to be targeted in an advertising campaign.

As used herein, the term "media type" refers to how, technologically, a given advertisement is displayed. For example, the media type may indicate whether a given advertisement is displayed via a WAP page, through a multi-media player, or embedded within a JAVA application.

As used herein, the term "category" refers to the types of products or services being advertised in a given advertisement (e.g., travel, groceries, sports & outdoors, name brand consumer goods, etc.).

As used herein, the term "inventory" refers to the overall quantity and identity of spots available for sale for display of advertising.

As used herein, the term "mobile wallet" refers to a payment platform technology that enables mobile device users to store their personal details and preferred payment options—including credit cards, debit cards and stored value accounts—in a virtual wallet in their mobile devices. Mobile device users then choose which payment method to use when making payments via their mobile phone for mobile Internet purchases, and retail payments at the point-of-sale in a manner similar to undertaking a transaction from a conventional wallet.

II. System Architecture

Figure 1A:
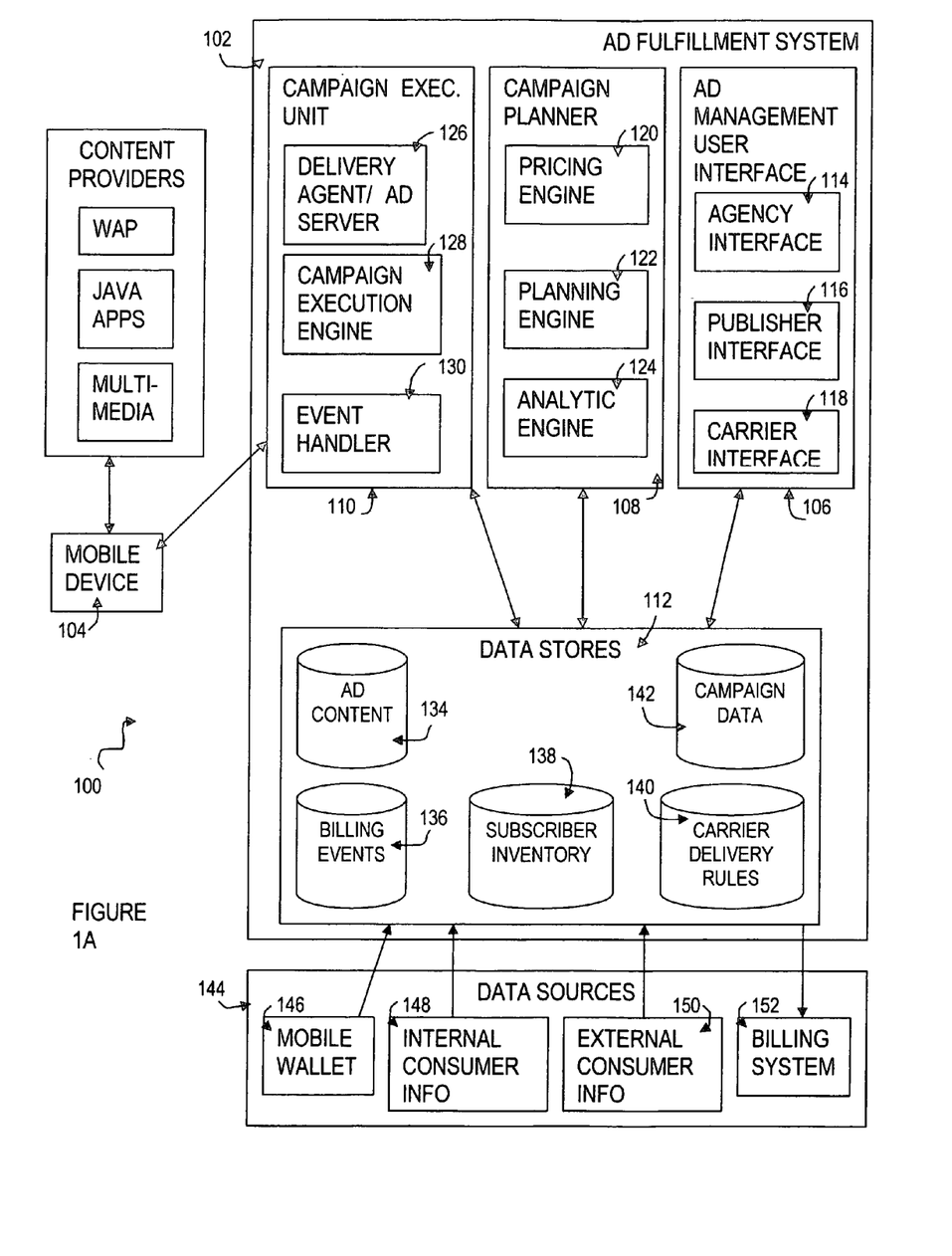
FIG. 1A is a block diagram of a high-level architecture for a system according to various embodiments of the present disclosure.

FIG. 1A is a block diagram of a high-level architecture for a system 100 for advertising management. The system 100 generally encompasses the advertisement fulfillment system 102 of a carrier and a mobile device 104 associated with the carrier. The mobile device 104 will be described in greater detail below with respect to FIG. 2. Typically, a mobile device 104 will be associated with a particular carrier with whom the user has contracted as a subscriber for services.

The advertisement fulfillment system 102 comprises an advertisement management user interface 106, a campaign planner 108, a campaign execution unit 110, and data stores 112. The advertisement management user interface 106 interfaces with the various users, and includes an interface for each type of user, such as an agency interface 114 for one or more advertisement agencies, a publisher interface 116 for one or more publishers, and a carrier interface 118 for the carrier for the advertisement fulfillment system. Through the agency interface 114, advertisement agencies may create advertising campaigns, supply advertisements, view the inventory, and view reports, each of which will be discussed in greater detail herein. Through the publisher interface 116, publishers may add inventory, receive advertisement Application Program Interfaces ("APIs") and view reports, each of which will be discussed in great detail herein. Similarly, through the carrier interface 118, the carrier may rate and price advertisements, generate delivery rules for advertisements, validate the advertisements, and view reports, each of which will be discussed in greater detail herein.

The campaign planner 108 comprises various engines, which may be implemented in hardware, software, or a combination of hardware and software. Specifically, the campaign planner 108 comprises a pricing engine 120, a planning engine 122, and an analytic engine 124. The campaign planner 108 is operably linked to the data stores 112 such that data in the various data stores 112 may be utilized by the pricing engine 120, the planning engine 122, and the analytic engine 124.

The pricing engine 120 facilitates the definition of pricing rules by the carrier. Within a given campaign, pricing may vary and be dependent on various factors. One factor that may affect pricing is the time the advertisement is served. Another factor that may affect pricing is the available inventory (based on supply and demand). Yet another factor that may affect pricing is the industry in which the advertisement will stimulate interest (for example, an automobile is worth more than a cup of coffee). Another factor that may affect pricing is which particular event causes an advertisement to be displayed (i.e., click-to-call when the user of the mobile device presses a button to make a call vs. click-to-URL when the user of the mobile device presses a button to connect to a particular website). Still another factor that may affect pricing is the channel by which the advertisement is broadcast (i.e., the media type—WAP and multimedia advertisements have different costs). Other factors that may affect pricing are the location of the device and whether targeting is used to determine which advertisement is displayed.

The planning engine 122 is the primary component of the campaign planner 108. The planning engine 122 interfaces between the other components to facilitate the campaign definition process. The planning engine 122 supports the various users as described above, namely the advertisement agency, publisher, and carrier. The functionality provided by the planning engine 122 for each of these users is discussed in turn below.

For the advertisement agency user, the planning engine 122 facilitates advertisement and campaign management by enabling the advertisement agency user to add, view, update, and delete advertisements. The planning engine 122 also provides campaign lifecycle management by enabling the advertisement agency user to define, view, update, delete, start, and stop campaigns. A campaign definition defined by the advertisement agency user with the planning engine 122 may, in various embodiments, include the following criteria: the campaign start date, the campaign end date, a number of impressions, a number of subscribers targeted by the campaign, advertisements, spots, a mapping of each advertisement to a spot, targeting criteria, and pricing. In various embodiments, the targeting criteria may include, for example, demographic data such as age, gender, marital status, income level, whether the user has children, and educational level. In various embodiments, the targeting criteria may include, for example, behavioral categories (i.e., sports, music, or travel preferences), or location of the subscriber (based on the subscriber zip code or a GPS location). In various embodiments, the targeting criteria may include, for example, search keywords. In various embodiments, the planning engine supports the dynamic addition and deletion of targeting criteria such as those described herein.

Figure 1B:
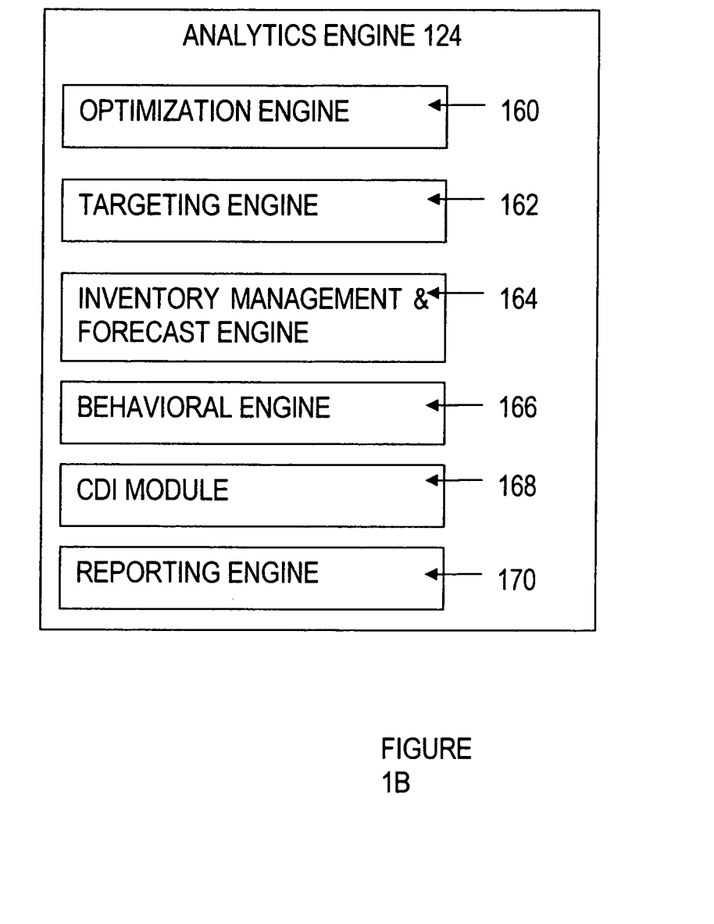
FIG. 1B is a more detailed block diagram of the analytics engine of the system of FIG. 1A according to various embodiments of the present disclosure.

As will be discussed below with respect to components of the analytics engine 124 regarding campaign modeling and planning optimization, the advertisement agency user can input a subset of the campaign information (i.e., targeting criteria) listed above and components of the analytics engine 124 will generate the remainder of the criteria necessary to meet the criteria that was specified. In various embodiments, the advertisement agency user may vary any of the above targeting criteria, and as a result, the analytics engine 124 recommends values for the non-varied criteria.

For example, in a first scenario, the advertisement agency user inputs at least start and stop dates, advertisements, spots (i.e., times available for advertising to be displayed) and targeting information such as, for example, targeting an age group of 18-35 year old males. Based on these provided inputs, the analytics engine 124 generates a number of impressions and a number of targeted subscribers. The analytics engine 124 references the inventory management and forecasting engine 164 (discussed in greater detail below) for fine-grain analysis of historical statistics.

For example, in a second scenario, the advertisement agency user inputs at least start and stop dates, advertisements, spots (i.e., times available for advertising to be displayed), a number of impressions (i.e., instances of display for each advertisements, such as no more than three times displayed) and a number of targeted subscribers. Based on these provided inputs, the analytics engine 124 generates the remaining necessary targeting criteria such as, for example, demographics and location, by referencing the historical statistics of the inventory management and forecasting engine 164.

For the publisher user, the planning engine 122 provides spot definition (i.e., a media type and category for each spot, or available time for advertising), and enables the publisher user to manually specify available inventory over different timeframes inventory available per day, month, and the like). The planning engine also enables the publisher user to obtain the executable code (such as WAP or JAVA instructions) used to insert advertisements into available spots. The planning engine further facilitates the user put in place advertisement restrictions (i.e., competitive exclusion).

For the carrier user, the planning engine 122 provides the ability to define carrier rules (including global rules). Carrier rules may include, for example, frequency capping, advertisement restrictions (competitive exclusion, language), and campaign weighting and priority. The planning engine 122 further provides the carrier user with the ability to manually overwrite or set the campaign priority (i.e., define which advertisements within a campaign have higher priority and should be displayed first), and define pricing rules. The planning engine 122 additionally provides the carrier user the ability to validate advertisement content, and the ability to start and stop campaigns. For all three types of user, the planning engine 122 is further operable to generate reports with respect to each of the functionalities described above.

The planning engine 122 interfaces with the targeting engine 162 of the analytics engine 124 (which will be further described herein below) to specify the targeting criteria for the campaign and review the resulting subscriber-base matches the targeting criteria. The planning engine 122 may also use the targeting engine 162 to model campaigns for campaign planning. The planning engine 122 may also use the targeting engine 162 to obtain targeting criteria to which a user can strategically target advertisements. The planning engine 122 uses the Inventory Management & Forecasting Engine 164 to determine the capacity of inventory available for advertisement placement as a result of the targeted subscriber base determined by the targeting engine 162 and the spots being requested. The planning engine 122 interfaces with the pricing engine 120 to determine the pricing for the campaign being planned based on the targeting and inventory being used.

The analytic engine 124 is the "brain" of the Advertisement Fulfillment System 102. The analytic engine 124 contains the data and intelligence to enable planning and execution of campaigns that meet the requirements needed to target highly relevant advertisements to subscribers. The analytic engine 124 includes various components (as shown in FIG. 1B), including an optimization engine 160, a targeting engine 162, an inventory management and forecasting engine 164, a behavioral engine 166, Customer Data Integration ("CDI") module 168, and a reporting engine 170.

The optimization engine 160 of the analytic engine 124 optimizes in-progress campaigns. The optimization engine 160 receives feedback on in-progress campaigns via the event handler 130 (FIG. 1A), and modifies or optimizes the in-progress campaigns based on campaign optimization rules. In various embodiments, examples of campaign optimization rules include promoting particular spots or particular advertisements that are performing better than others, or prioritizing a particular campaign lagging behind in number of impressions.

The optimization engine 160 supports two modes of adjustment: automated campaign adjustment that requires no human intervention, and manual adjustment, where the optimization engine 160 provides recommendations but the recommendations are not implemented until a user triggers the change to the in-progress campaign.

For an automated or manually implemented adjustment, the optimization engine 160 interfaces with the planning engine 122 to create a modified campaign. The optimization engine 160 leverages the logic used to create and/or modify a campaign (which will be described in greater detail below). The planning engine 122 then automatically pushes the modified campaign to the campaign execution engine 128, or for a manual adjustment, presents the modified campaign to a user. The user reviews the modified campaign, and decides which, if any, of the modified recommendations to provide to the planning engine 122.

The targeting engine 162 of the analytic engine 124 provides one-to-one targeting functionality (i.e., at the subscriber level) for campaigns. Two types of targeting are supported: demographic targeting and behavioral targeting. The targeting engine 162 processes the data provided by other components (e.g., the CDI module 168 and the behavioral engine 166 which will be discussed in detail below) to result in data that may be stored in the various data stores.

Upon receiving certain targeting criteria, the targeting engine 162 returns a subscriber base that meets the specified targeting criteria. Additionally, the targeting engine conducts campaign scenario modeling, which involves running campaign tests and "what if" scenarios for the purpose of campaign planning, with the goal of planning an optimally successful campaign. In various embodiments, the targeting engine 162 may assist in determining targeting criteria to maximize the effectiveness of the campaign.

The targeting engine 162 operates on data that is known for a given subscriber, and thus some forms of location targeting may not be supported by the targeting engine 162 (e.g., non-fixed, GPS location is not known ahead of time). The planning engine 122 is, however, operable for targeting by location, which is a runtime decision implemented by the campaign execution engine 128 as to whether a particular subscriber meets specific location targeting criteria.

The inventory management and forecasting engine 164 of the analytic engine 124 performs inventory management functions across all different types of delivery vehicles (i.e., WAP, Multimedia etc). The inventory management and forecasting engine 164 accomplishes inventory management by dynamically determining the capacity for a given publishing spot based on previous customer usage and business rules (i.e., it might boost availability 20% for Superbowl week for a given spot). The inventory management and forecasting engine 164 receives the events information from the event handler 130. Initially, prior to having historical customer usage data, the available inventory across all spots is manually set. Previous customer usage being tracked in the carrier data archiving systems may be used by the inventory management and forecasting engine 164 to predict the initial available inventory.

Figure 2:
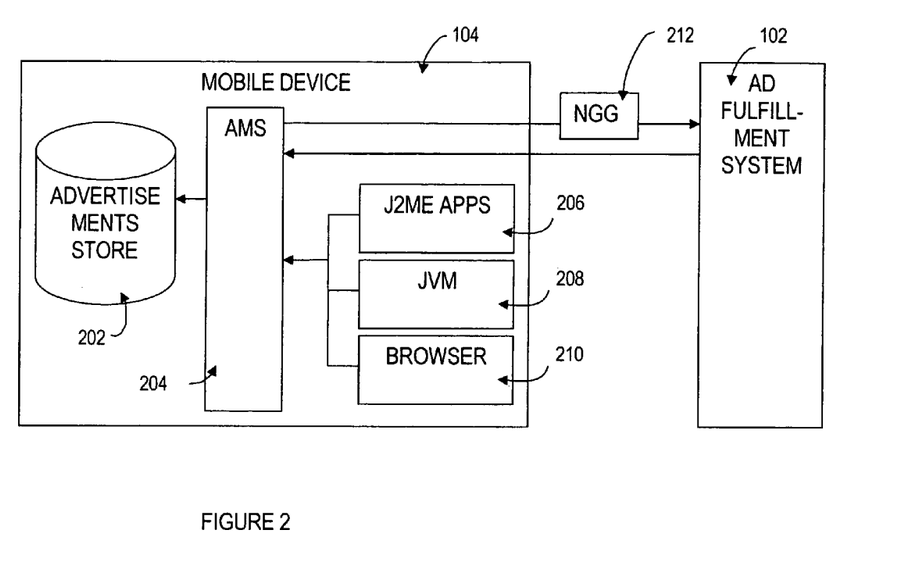
FIG. 2 is a more detailed block diagram of the mobile device of the system of FIG. 1A according to various embodiments of the present disclosure.

In various embodiments, such data includes a WISP_LOG table in Call Detail Records ("CDR") archive, which stores user click through information from Network Gateway ("NGG") 212 between the device 104 and the AFS 102. The CDR archive is a carrier data store that keeps track of subscriber web usage (including visits to URL sites) and Transaction Detail Records ("TDRs"). TDRs are subscriber records of Premium Content Purchase. CDRs and TDRs can be used to conduct behavioral analysis of users of mobile devices in order to target advertisements based on behavior. The NGG 212 is the gateway through which all HTTP requests from the handset travel. The NGG 212 is the mechanism that inserts the unique client id in the HTTP header requests. The unique client id is subsequently passed on to the publisher, and may then be passed on to the Ad Fulfillment System 102 when a request is made for an advertisement. The unique client id inserted into the HTTP requests by the NGG 212 allows the Ad Fulfillment System 102 to uniquely identify each user of a mobile device to whom an ad will be served, which may then be used in targeting advertisements to specific users of mobile devices.

Based on the subscriber-base targeted for a given campaign, other campaign parameters (time/date), and global rules (frequency capping), the inventory management and forecasting engine 164 determines the relevant inventory for a given spot. Because the subscriber-base targeted for a given campaign is known (as discussed with respect to the targeting engine 162 herein), the inventory management and forecasting engine 164 determines the impact to available inventory as a result of the targeting criteria.

The behavioral engine 166 of the analytic engine 124 associates categories with subscribers based on the subscribers' behaviors. Such categories may include Sports, News, Entertainment, or other potential subscriber interests. The behavioral engine 166 utilizes events recorded by the event handler 130 and various behavior rules defined by the carrier, to determine the appropriate category assignments for each subscriber. The categorical data assigned by the behavioral engine 166 augments the demographic data stored by the CDI module 168. Demographic data may be linked to behavioral data because targeting for a specific campaign may leverage both demographic data and behavioral data for an existing customer base.

The CDI module 168 of the analytic engine 124 imports data from various internal customer data sources (i.e., carrier sources) with multiple file formats, and augments that data with customer data from external sources such as publishers, advertisers or $3^{rd}$ party data (i.e., InfoUSA) into a single customer data store. The primary type of data in this single data store generated by the CDI module 168 is demographic data (age, gender, marital status, and the like). In order to integrate the internal and external data, the CDI module 168 matches data by relating and/or associating data. In various embodiments, this is performed by identifying a primary key. Additionally, the CDI module 168 transforms data into a common file format, and merges the data. Finally the CDI module 168 cleans up merged the data by removing duplicates (i.e., "de-duplicating"). The CDI module 168 additionally imports multiple incoming file formats (i.e., comma delimited, XML, and the like) through the use of a tool without requiring coding.

The reporting engine 170 of the analytic engine 124 performs what is commonly referred to in the industry as Web Analytics, or data mining. The reporting engine 170 produces the following reports: status and/or results of in-progress campaigns (i.e., near real-time statistics), status and/or results of past campaigns, statistics on forecast versus actual campaign data, statistics on targeting results, statistics on performance according to publisher, and statistics on performance according to advertisement. Additionally, the reporting engine 170 enables the user to create custom reports on any data that is stored in the Data Stores 112 discussed below.

Returning to FIG. 1A, the campaign execution unit 110 comprises various components, which may be implemented in hardware, software, or a combination of hardware and software. The campaign execution unit 110 is responsible for delivering advertisements to mobile devices 104. In the present illustrative framework, there are two types of advertisement delivery by the campaign execution unit 110: pull advertisements and pushed advertisements. In the case of pull advertisements, the user of the mobile device 104 accesses the internet or a particular application and advertisements appear in the mobile device 104 as a result of this activity. In the case of push advertisements, initiating display of the advertisement requires no initiative or activity by the user (e.g., an unsolicited Short Message Service "SMS" message). Specifically, the campaign execution unit 110 comprises a delivery agent/advertisement server 126, a campaign execution engine 128, and an event handler 130. The campaign execution unit 110 is operably linked to the data stores 112 such that data in the various data stores 112 may be utilized by the delivery agent/advertisement server 126, the campaign execution engine 128, and the event handler 130.

The delivery agent/advertisement server 126 generally receives advertisement requests (in case of pull ads) from a client or server-based application, requests an advertisement from the Execution Engine, and responds with an advertisement to be served. In case of push advertisements, the delivery agent/advertisement server 126 receives the advertisement content from the campaign execution engine 128 and sends the content to the mobile device 104. The delivery agent/advertisement server 126 uses the specific protocols needed to receive advertisement request and deliver advertisements. In various embodiments, the primary protocol used for receiving advertisement requests and delivering advertisements is HTTP.

The campaign execution engine 128 executes advertisement campaigns defined and activated with the Campaign Planner 108. The campaign execution engine 128 serves the advertisements for a given campaign upon receiving the advertisement requests (in case of pull ads). Upon receiving an advertisement request from the delivery agent/advertisement server 126 (in case of pull ads), the campaign execution engine 128 determines the appropriate advertisement to be served based on complex rules and parameters. In various embodiments, some criteria involved in determining the correct advertisement include:

- subscriber data (based on behavioral or demographic targeting),
- campaign weighting (i.e., bid pricing, actual impressions delivered vs. planned impressions),
- advertisement weighting and carrier delivery rules (e.g., frequency capping, advertisement placement restrictions),
- publisher requirements (i.e., different advertisements for different publishers and different spots),
- publisher content type (i.e., type of media being published such as WAP, Multimedia, and the like),
- time of day,
- location of the subscriber (in various embodiments, location is passed to the advertisement management system from the publisher, for example, subscriber zip code, or carrier, for example, GPS defined location), and
- contextual (e.g., the advertisement is selected as a result of what the user of the device is doing, such as performing a search with keywords. The context of keywords, defined as part of campaign, or a keyword passed to the advertisement management system from the publisher can be used to push related advertisements).

The campaign execution engine 128 receives some or all of the following information when an advertisement is requested: the subscriber id for the mobile device 104, the publisher (i.e., spot id), the content type, the location, and one or more keywords. The campaign execution engine 128 uses this information to determine the set of campaigns that are associated with the request, accomplished by looking for campaigns associated with the subscriber id and the spot id of the request.

Illustrative pseudo-code for determining the set of campaigns associated with an advertisement request is as follows:

```
If single campaign
    If Delivery rules state to deliver the ad
        Determine the correct advertisement & deliver the ad
    Else do not deliver the ad
Else multiple campaigns
    While campaigns
        Choose highest weighted campaign
        If Delivery rules state to deliver the ad
            Determine the correct advertisement & deliver the
                advertisement
        Else go to next weighted campaign
```

In various embodiments, the campaign execution engine 128 utilizes a set of global delivery rules (which may or may not be hard coded) to make the decision on which campaign and advertisement to serve to the mobile device 104. The global rules may be defined by the carrier using the carrier user interface 118 of the Advertisement Fulfillment System 106. In various embodiments, decision making of the campaign execution engine 128 based on the global rules is accomplished in a timely manner (such as, for example, in less than 200 msec) to keep the overall latency of advertisement serving to the subscriber to a minimum.

The global delivery rules, in various embodiments, may be very complex. For example, if frequency capping for a subscriber is met and a particular campaign is lagging on its last day, the campaign execution engine may be enabled by the global rules to break the frequency capping rule and serve the advertisement in order to meet the goals of the campaign. In order for the campaign execution engine 128 to execute the global rules, the campaign execution engine 128 tracks information on previously served ads. The tracked information may include, for example, how many times an advertisement been served to a particular subscriber (e.g., for frequency capping), how many times has an advertisement been served for a given campaign (e.g., when an advertisement can be served for multiple campaigns and campaign weighting needs to be taken into consideration).

For push advertisements, the campaign execution engine also pushes advertisements for campaigns to the delivery manager. Finally, the campaign execution engine 128 sends information regarding "advertisement events" to the event handler 130.

The event handler 130 receives advertisement events from the campaign execution engine, user actions or other sources, and records those events into an events database. The event handler 130 processes events as needed. For either push or pull advertisements, the campaign execution engine sends the "impression" delivery event to the event handler 130. For user actions, referred to in the industry as "click" events (click-to-url, click-to-call, click-for-SMS), the event handler 130 records the event and may call another component for subsequent action such as, for example, sending an SMS, or directing to another WAP site. Other sources of events include the Mobile Wallet and applications running on the mobile device 104 (such as, for example, a multimedia player and downloaded JAVA 2 Micro Edition "J2ME" applications). Each event handled by the event handler 130 may be used in billing and analytics (which are described in greater detail herein).

The data stores 112 comprise various databases, including an advertisement content store 134, a billing events store 136, a subscriber inventory store 138, a carrier delivery rules store 140, and a campaign data store 142. The advertisement content store 134 may store the entire stock of advertisements that may be managed by the Advertisement Fulfillment System 102, and transferred over to storage in the advertisements store 202 on a mobile device 104. The billing events store 136 stores invoicing data that may be used in billing advertising agencies, and settlement records that may be used in settling up with publishers for campaigns run on the system. The subscriber inventory store 138 stores subscriber data pertaining to each user that subscribes to the carrier, including subscriber identifiers and demographic data. The data in the subscriber inventory store 138 may be continuously or periodically updated. The carrier delivery rules store 140 stores rules relating to campaigns or particular advertisements or types of advertisements pertaining to how and when advertisements may be displayed. For example, a carrier rule may impose restrictions on frequency of advertisement display, advertisement restrictions such as competitive exclusion or language, and campaign weighting and priority. The campaign data store 142 stores data relating to campaigns, including, for example, targeting information, progress in a campaign, impression counts for specific advertisements, duration of the campaign, and the like. The data stores 112 are populated by various data sources 144. The data sources 144 include a subscriber mobile wallet 146 that contains personal identifying and financial data for the user of the mobile device, internal consumer info 148 maintained by the carrier, external consumer info 150 maintained by third parties, and a billing system 152 used for managing billing for advertising (as opposed to the billing system for the telecommunication services provided by the mobile device).

The present disclosure expands upon the different media types included as inventory for advertising in mobile devices. For instance, WAP pages are an inventory similar to internet web pages, but formatted in Wireless Application Protocol, a protocol created for mobile devices such as PDAs and mobile phones, designed to give users a richer data application experience that would enable "access to the Internet" through mobile devices. WAP pages may be the source of advertising inventory in the sense that ad banners or ad text may be added to web pages. Such ad banners or texts may, in various embodiments, be interactive (e.g., click-to-call, click-to-coupon, click-to-url, etc.).

Short Message System ("SMS") is a service available on most digital mobile phones that permits the sending of short messages (also known as text messages, messages, or more colloquially SMSes, texts or even txts) between mobile phones, and other handheld devices. SMS messages may be the source of advertising inventory (i.e., push technology instead of pull technology such as WAP pages, since messages can be pushed to a mobile device without subscriber initiation). SMS messages may be used to selectively push advertisements, or alternatively, they could be used as a result of a subscriber interaction with an advertisement elsewhere (such as, for example, when the user clicks on a banner advertisement to register for a contest, an SMS message could be pushed to send an entry notification to the user).

Multimedia content may be still another source of advertising inventory. Multimedia content includes content that is played on a media player on the handset, similar to playing audio/video using Microsoft Media Player or Apple's QuickTime Pro on a computer. Multimedia content may be either "on demand" or "live content." In on demand content, a video clip of a predetermined length is played. In the case of on demand content, an advertisement may be played before the requested clip (pre-roll), during the requested clip, or after the requested clip (post-roll). In the case of live content, the content is streamed and plays as long as the user permits the media player to play it. Similar to regular television, advertisements may be inserted into the stream. In various embodiments, there are both national and local ad spots.

Searches, as a subset of WAP pages, comprise still another source of advertising inventory in the sense that a user may enter keywords in a search, and the keywords may be utilized in targeting advertisements. For instance, if a user entered into a search the keywords "bed frames," advertisements for local mattress stores may be triggered based on context. Search engines enable contextual targeting with the user of the mobile device providing in the search string things of interest to her.

A directory application may provide additional advertising inventory in the sense that a directory is a subset of Java applications, and advertisements may be served up in any type of JAVA application. In a type of directory JAVA that gives directions, advertisements relevant to locations along the direction route may be placed in the application along with the directions. Similarly advertisements may be displayed in a web page application providing directory assistance.

Location based applications may be additional advertising inventory in the sense that in java applications, a particular advertisements may be served up in response to a determination of the location of the mobile device.

Start-up/shut-down of J2ME applications may be advertising inventory in the sense that they offer additional locations within a JAVA application where advertisements may be placed. In addition to placing advertisements at the startup and shutdown of a Java application, advertisements may be embedded within an application itself as it runs on the mobile device. For example, in an application for a race car game, an advertisement may be displayed in a road sign graphic in the game or at the bottom of a game where white space is available next to the score, the timer, etc.

A block diagram of an illustrative mobile device 104, as it interacts with the advertisement fulfillment system 102 is shown in FIG. 2. In various embodiments, the mobile device 104 comprises a cellular or wireless telephone, personal digital assistant ("PDA"), handheld computer, or the like operable as a mobile communication device when used in conjunction with telecommunication services provided by a carrier. The mobile device 104 comprises, in addition to its basic functionality for communication, an Advertisements Store 202, an Advertisement Management System ("AMS") 204, various J2ME applications 206, a JAVA Virtual Machine ("JVM") 208, and a Browser 210. The Advertisement Management System 204 manages the Advertisements Store 202 on the mobile device 104. At least one default advertisement is present in the Advertisements Store 202 and never deleted. A default advertisement for the carrier is stored in the Advertisements Store 202 at a time of manufacture or packaging for sale.

For each advertisement within the Advertisements Store 202, the following may be stored: a name of the advertisement, the content of the advertisement (which in various embodiments comprises a banner style of ad), an expiration date and time, and in an impressions field, a number of impressions (i.e., number of times that the particular advertisement will be displayed before deletion). In some embodiments, each time an advertisement is displayed, the AMS 204 reduces the impressions field by 1, and when the impressions field is zero, the AMS 204 deletes the advertisement from the Advertisements Store 202.

III. Method for Loading Advertisements

Figure 3:
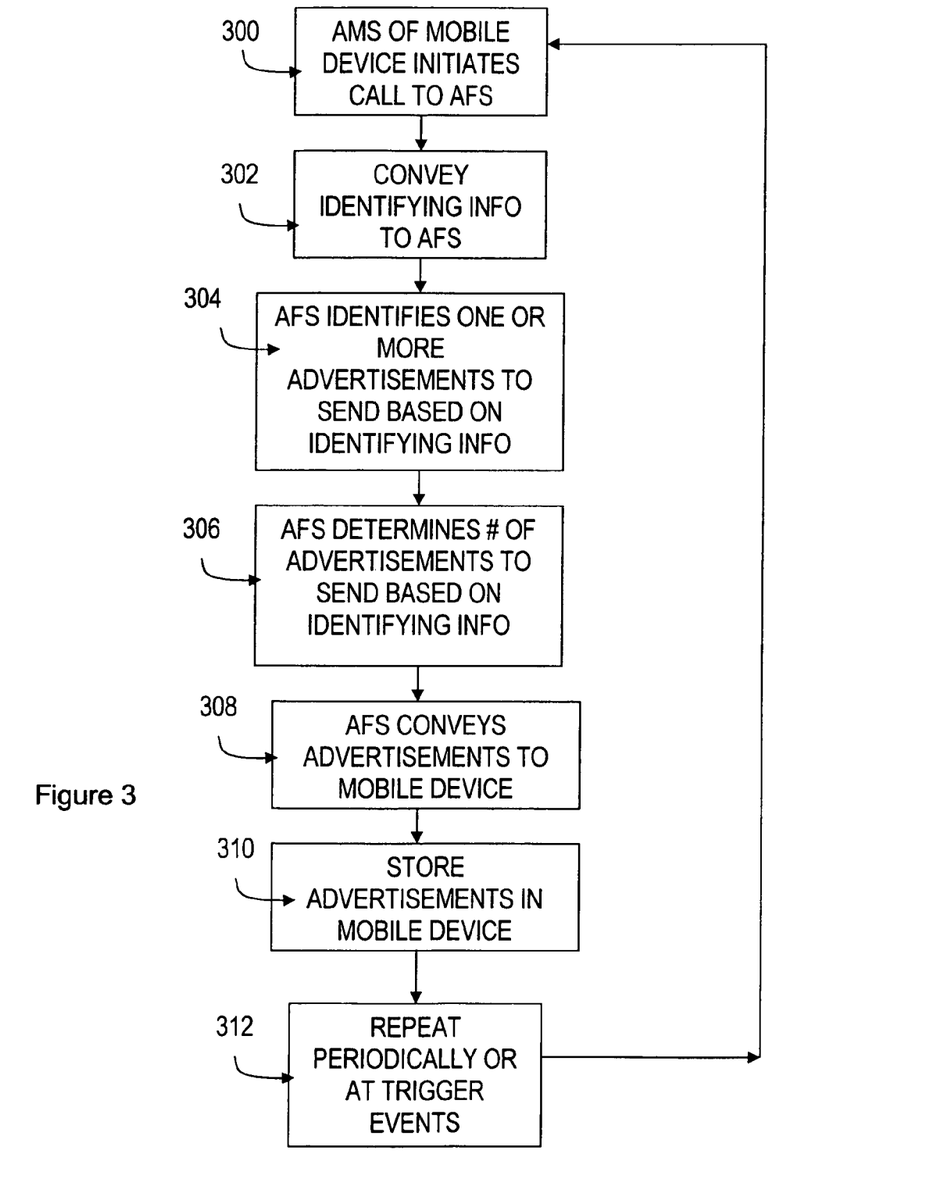
FIG. 3 is a logic flow diagram of a method for adding dynamic advertising content according to various embodiments of the present disclosure.

FIG. 3 provides a logic flow diagram of a method for providing dynamic advertising content according to various embodiments of the present disclosure. Having been initiated at a time of manufacture or packaging with one default advertisement, the Advertisement Management System 204 of the mobile device 104 from time to time initiates a call to the Advertisement Fulfillment System 102 (block 300). In various embodiments, this call is made via HTTP according to methods one skilled in the art will appreciate. In various embodiments, this call may be made via any type of remote call, including, for example, a call via Transmission Control Protocol ("TCP"), or JAVA Remote Method Invocation ("RMI"). In the call, the Advertisement Management System 204 of the mobile device 104 conveys identifying information about the mobile device 104 and the subscriber of the mobile device 104 (block 302). In some embodiments, the identifying information comprises a unique subscriber identifier and a device identifier. In case of HTTP call embodiments, the NGG 212 inserts the unique subscriber identifier in the HTTP header. In other embodiments, the AMS 204 on the device 104 may include the subscriber identifier in the call.

In response to the call, the Advertisement Fulfillment System 102 (and more specifically, the delivery agent/advertisement server 126) will identify one or more advertisements to send to the mobile device 104 to store in the Advertisements Store 202 based on identifying information and currently executing campaigns (block 304). In various embodiments, the Advertisement Fulfillment System 102 identifies specific advertisements to convey based upon the identifying information about the mobile device 104. For example, based on the unique subscriber identifier, the Advertisement Fulfillment System 102 determines which advertisements to send, according to the campaign planner 108. In various embodiments, the advertisements which are sent may be chosen according to demographical information related to the subscriber, behavioral information related to the subscriber, or location information pertaining to where the subscriber (and mobile device 104) is located. Similarly, based on the device identifier, the Advertisement Fulfillment System 102 will determine how many advertisements to send at a time (block 306). In various embodiments, the Advertisement Fulfillment System 102 determines how many advertisements to send at a time based on the amount of storage space available in the Advertisements Store 202 on the mobile device 104. For example, some devices are designed with more storage for advertisements than others, so greater numbers of advertisements, or advertisements that require greater amounts of storage, may be sent and stored in the device. The device type may be determined by using the identifying information and referencing a local database (not shown), or may be determined from a header field in the call, populated in some embodiments by NGG 212.

The Advertisement Fulfillment System 102 conveys the selected advertisement(s) to the mobile device 104 (block 308), and the advertisements conveyed are then stored in the Advertisements Store 202 (block 310). This process is repeated, either periodically or based on various triggering events, such as an amount of time that has passed, the advertisements store is empty other than the default advertisement, the beginning of a new advertising campaign, or the like (block 312).

IV. Method for Placement and Dynamic Content Rotation

Figure 4:
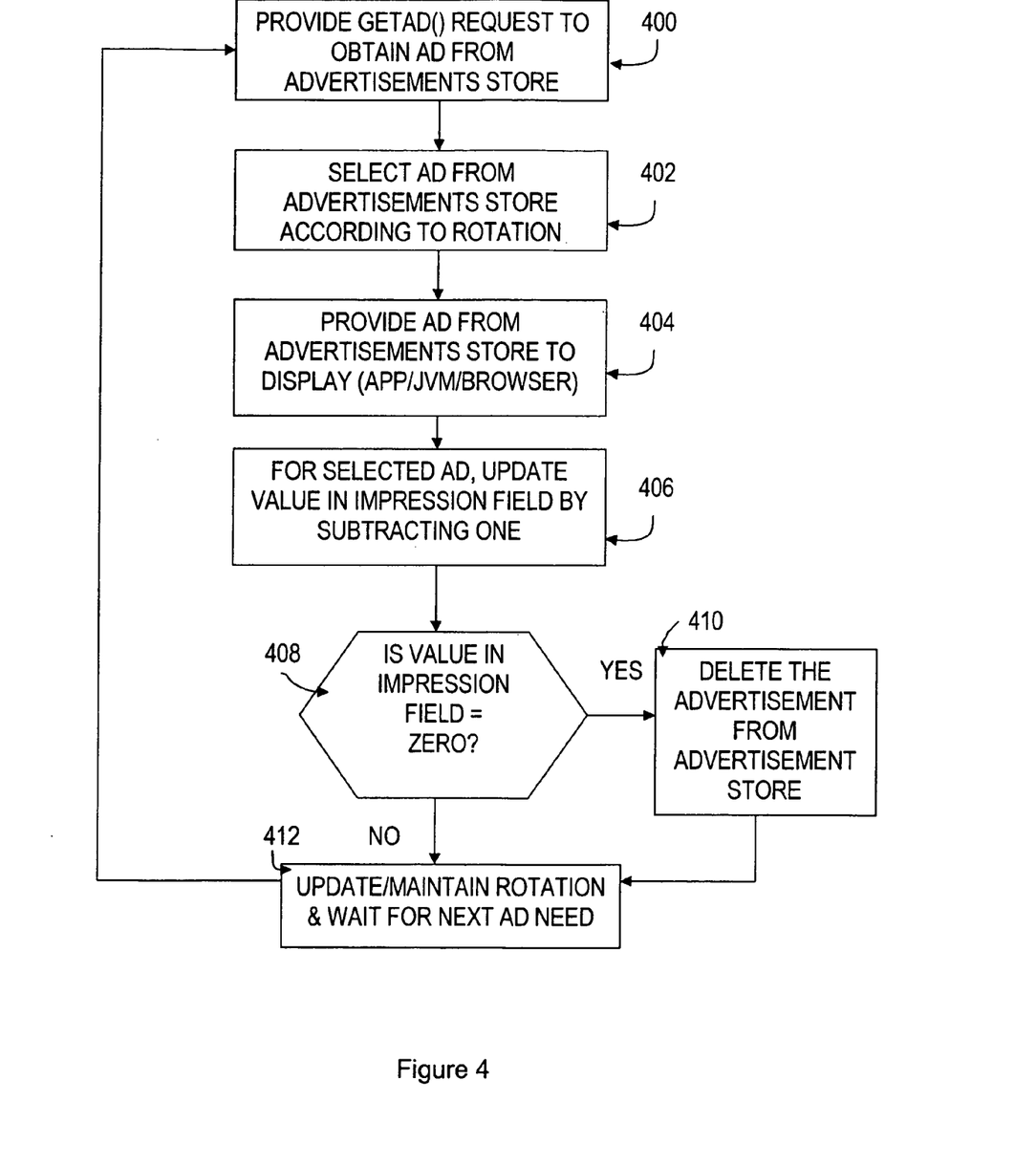
FIG. 4 is a logic flow diagram of a method for rotating and placement of advertising content according to various embodiments of the present disclosure.

FIG. 4 provides a logic flow diagram of a method for rotating and placement of advertising content according to various embodiments of the present disclosure. As shown in FIG. 3, at certain times the Advertisement Management System 204 provides a "getAd( )" Application Programming Interface ("API") call for one of the J2ME apps 206, the JVM 208, or the Browser 210 on the device to use in order to obtain an advertisement from the Advertisements Store 202 (block 400). Each application determines when to have the getAd API call provided based on the logic embedded in the JAVA code for the particular application. For example, a JAVA application may call the getAd API during startup, while waiting for the application to initialize. Similarly, when advertisements are embedded in the application for example, the application is coded so as to call the getAd API to populate the advertisements into the application while it runs.

In various embodiments, the Advertisement Management System 204 provides the getAd( ) API when triggered by an event, i.e., invocation of a program. The Advertisement Management System 204 selects an appropriate advertisement (block 402). In various embodiments, the advertisements are stored with rotation information in the Advertisements Store 202, and the Advertisement Management System 204 selects the appropriate advertisement based on the rotation information. The rotation information may include a pointer stored in memory that rotates which advertisement is selected for display. In other embodiments, the rotation order may be chronologically based using the date the advertisements were added to the advertisements store 202, or using the expiration date of the advertisements in the advertisements store 202. Alternatively, the rotation order may be logically based using rules from one or more on-going advertising campaigns. By incorporating the logic for advertisement rotation in the AMS, and storing ads on the handset (as opposed to interfacing with the Ad Fulfillment System upon each request), latency introduced in individual transfer of an advertisement upon request from the Ad Fulfillment System 102 to the Advertisement Management System 204 is avoided.

The Advertisement Management System 204 (FIG. 2) provides the selected advertisement to the J2ME app 206, the JVM 208, or the Browser 210 that will display the advertisement (block 404). The Advertisement Management System 204 also updates value in the impression field in the Advertisements Store 202 for the selected advertisement by subtracting one (block 406). A check is performed to determine whether, for the selected advertisement, the value in the impression field is zero (block 408). If the value in the impression field in the Advertisements Store 202 for the selected advertisement is zero, the Advertisement Management System 204 deletes the advertisement as having been displayed a predetermined number of times (block 410). Then the Advertisement Management System 204 updates the rotation of the advertisements and waits until the next advertisement is needed (block 412). If the value in the impression field in the Advertisements Store 202 is not zero, the Advertisement Management System 204 maintains the advertisement in the advertisements store 202, maintains the rotation of the advertisements, and waits until the next advertisement is needed (block 412). With each successive getAd( ) request, the Advertisement Management System 204 provides the next advertisement in succession (in a round robin fashion, randomly or according to other sequencing approaches known to those of skill in the art) when multiple advertisements are present in the Advertisements Store 202. In this fashion, the multiple advertisements are rotated over time.

In various embodiments, if only one advertisement is present in the Advertisements Store 202, it is the default advertisement and is returned for each getAd( ) request until additional advertisements are stored in the Advertisements Store 202. The value in the impression field for the default advertisement is never reduced to zero.

In various embodiments, if the expiration date for a particular advertisement is reached before the impression field for that advertisement is zero, the advertisement is deleted from the Advertisements Store 202, and is not returned by Advertisement Management System 204 in response to a getAd( ) request.

V. Method of Data Mining & Analytics

Figure 5:
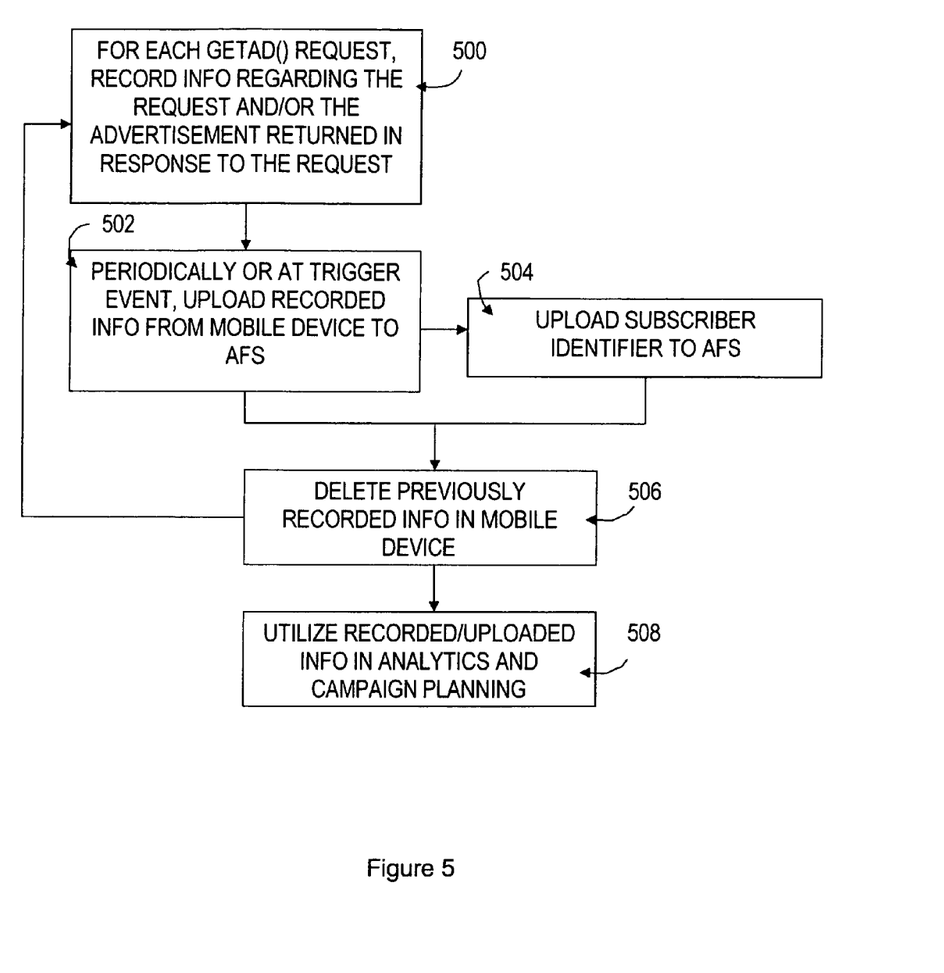
FIG. 5 is a logic flow diagram of a method of obtaining analytics from dynamically changing advertising content according to various embodiments of the present disclosure.

As shown in FIG. 5, for each getAd( ) request, the Advertisement Management System 204 records certain information (block 500). The recorded information may pertain to the request made or the advertisement returned in response to the request. For example, the recorded information may include, in various embodiments, the name of the advertisement returned, the date and time of the getAd( ) request, and the identity of requesting application (i.e. the particular J2ME application, the JVM, or the Browser). In various embodiments, the identity of the requesting application may be provided by the requesting application in the getAd( ) call.

Periodically, or in response to a triggering event such as the next occurrence of requesting a set of advertisements, the Advertisement Management System 204 uploads the recorded information to the Advertisement Fulfillment System 102 (block 502). In some embodiments, the unique subscriber identifier is passed to the Advertisement Fulfillment System 102 in each individual call, thus re-conveying the subscriber identifiers is unnecessary. In some embodiments, the Advertisement Management System 204 may optionally send the unique subscriber identifiers (which were recorded along with each getAd( ) API) to the Advertisement Fulfillment System 102 (block 504). Once the recorded information has been successfully uploaded, the Advertisement Management System 204 may delete the recorded information and start anew recording information with each getAd( ) request (block 506). The recorded information, once uploaded to the Advertisement Fulfillment System 102, may be used by the planning engine 122 and the analytic engine 124 in further advertisement campaign planning and analysis of the efficacy of previous advertisement campaigns (block 508).

Figure 6:
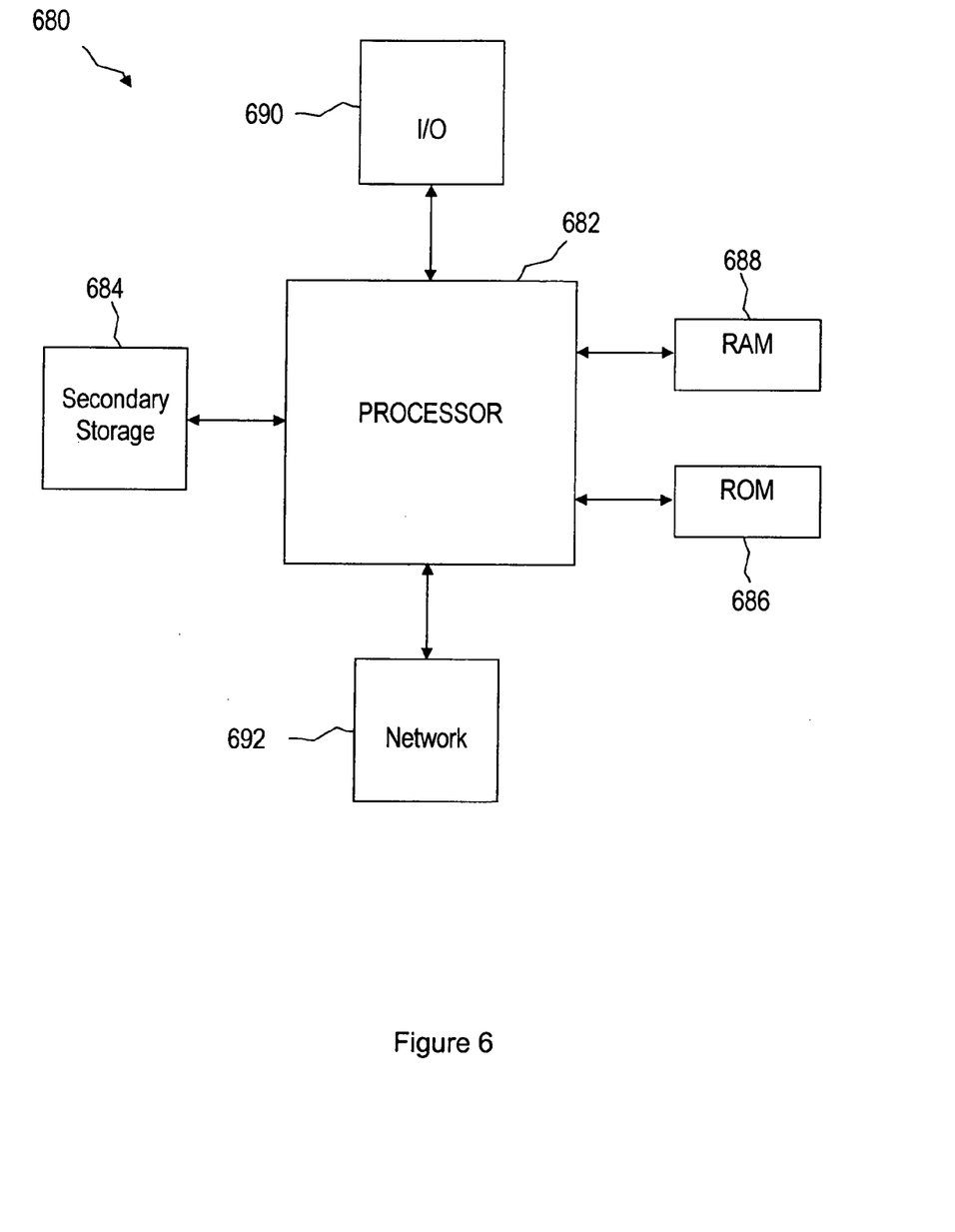
FIG. 6 shows an illustrative general purpose computer system suitable for implementing, at least in part, the several embodiments of the disclosure.

The dynamic content distribution and placement framework of the present disclosure may be implemented, at least partially, on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, reads only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are reads during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A mobile device for dynamic content distribution and placement of advertising, comprising:
    an advertisement storage on the mobile device that stores a plurality of targeted advertisements selected and delivered by an external advertisement fulfillment system from a plurality of advertisements in an advertisement content data store based on at least one of a plurality of rules, wherein the external advertisement fulfillment system manages a plurality of advertising campaigns, and wherein the plurality of targeted advertisements comprise advertisements from at least two advertising campaigns of the plurality of advertising campaigns;

an advertisement management system on the mobile device that manages the advertisement storage to dynamically change which advertisement of the plurality of targeted advertisements is presented to a user based on at least one higher priority rule of the plurality of rules, wherein one of the external advertisement fulfillment system and the advertisement management system applies the higher priority rule of the plurality of rules, breaks a lower priority rule of the plurality of rules in response to applying the higher priority rule, and changes a priority of one of the at least two advertising campaigns based on applying the higher priority rule; and at least one executable application on the mobile device that presents the plurality of targeted advertisements to the user.

2. The mobile device for dynamic content distribution and placement of advertising of claim 1, wherein the plurality of advertising campaigns are defined by a user input comprising at least one of a campaign start date, a campaign stop date, a number of impressions, a number of target subscribers, an advertisement, one or more advertisement spots, a mapping of the advertisement to an advertisement spot, a price, and one or more targeting criteria.

3. The mobile device for dynamic content distribution and placement of advertising of claim 1, wherein the advertisement management system dynamically changes which advertisement of the plurality of targeted advertisements is presented to the user based further on which advertisement was last displayed.

4. The mobile device for dynamic content distribution and placement of advertising of claim 1, wherein the plurality of targeted advertisements are stored with rotation information in the advertisement storage, and wherein the advertisement management system dynamically changes which advertisement of the plurality of targeted advertisements is presented to the user based further on the rotation information.

5. The mobile device for dynamic content distribution and placement of advertising of claim 1, wherein the advertisement management system dynamically changes which advertisement of the plurality of targeted advertisements is presented to the user based further on when the plurality of targeted advertisements were added to the advertisement storage.

6. The mobile device for dynamic content distribution and placement of advertising of claim 1, wherein the one of the external advertisement fulfillment system and the advertisement management system changes the priority of one of the at least two advertising campaigns that is lagging behind in number of impressions based on applying the higher priority rule, wherein the lower priority rule is a frequency capping rule, and wherein the frequency capping rule defines how many times each of the advertisements is to be served to the user.

7. The mobile device for dynamic content distribution and placement of advertising of claim 1, wherein the advertisement management system further collects subscriber behavioral information, wherein the subscriber behavioral information at least comprises information about user actions with the mobile device other than information about user interaction with advertisements, and wherein the subscriber behavioral information is used by the external advertisement fulfillment system to select and convey targeted advertisements to the advertisement storage.

8. The mobile device for dynamic content distribution and placement of advertising of claim 7, wherein the information about the user actions with the mobile device includes at least one of user web usage information and user purchase information.

9. The mobile device for dynamic content distribution and placement of advertising of claim 1, wherein the advertisement management system periodically automatically initiates a call to the external advertisement fulfillment system in order to cause the external source to select and convey one or more targeted advertisements for storage in the advertisement storage.

10. The mobile device for dynamic content distribution and placement of advertising of claim 9, wherein the call to the external advertisement fulfillment system includes identifying information.

11. The mobile device for dynamic content distribution and placement of advertising of claim 10, wherein the external advertisement fulfillment system determines the number and identity of the plurality of targeted advertisements to convey to the mobile device based on the identifying information.

12. The mobile device for dynamic content distribution and placement of advertising of claim 10, wherein the identifying information comprises a subscriber identifier unique to the user of the mobile device is inserted into the call by a gateway between the external advertisement fulfillment system and the mobile device, and the identifying information further comprises a device identifier unique to the type of the mobile device.

13. The mobile device for dynamic content distribution and placement of advertising of claim 12, wherein the device identifier enables the external advertisement fulfillment system to determine an amount of storage space available in the advertisement storage.

14. The mobile device for dynamic content distribution and placement of advertising of claim 12, wherein the external advertisement fulfillment system delivers advertisements based on the device identifier.

15. The mobile device for dynamic content distribution and placement of advertising of claim 12, wherein the subscriber identifier enables the external advertisement fulfillment system to identify particular targeted advertisements to send to the advertisement storage.

16. The mobile device for dynamic content distribution and placement of advertising of claim 12, wherein the external advertisement fulfillment system delivers targeted advertisements based on the subscriber identifier.

17. The mobile device for dynamic content distribution and placement of advertising of claim 1, wherein, for each advertisement delivered from the external advertisement fulfillment system, the advertisement storage stores at least one of a name of the advertisement, substantive content of the advertisement, an expiration date of the advertisement, an expiration time of the advertisement, and a number of impressions in an impression field.

18. The mobile device for dynamic content distribution and placement of advertising of claim 1, wherein each time an advertisement is presented to the user, the advertisement management system updates an impression field associated with the advertisement and deletes the advertisement from the advertisement storage when the impression field is equal to zero.

19. A system for dynamic content distribution and placement of advertising, comprising:

an advertisement content data store that stores a plurality of advertisements;

an advertisement fulfillment system external to a mobile device that manages a plurality of advertising campaigns and selects a plurality of targeted advertisements from the plurality of advertisements stored in the advertisement content data store for the mobile device based on at least one of a plurality of rules, wherein the plurality of targeted advertisements comprises advertisements from at least two advertising campaigns of the plurality of advertising campaigns; and the mobile device comprising:

an advertisement storage that stores the plurality of targeted advertisements delivered from the advertisement fulfillment system;

an advertisement management system that manages the advertisement storage to dynamically change which advertisement of the plurality of targeted advertisements is presented to a user based on at least one of the plurality of rules, wherein one of the advertisement fulfillment system and the advertisement management system applies a higher priority rule of the plurality of rules, breaks a lower priority rule of the plurality of rules in response to applying the higher priority rule, and changes a priority of one of the at least two advertising campaigns based on applying the higher priority rule; and at least one executable application on the mobile device that presents the plurality of targeted advertisements to the user.

20. A method for dynamic content distribution and placement of advertising, comprising:

managing, by an advertisement fulfillment system external to a mobile device, a plurality of advertising campaigns;

selecting, by the advertisement fulfillment system, a plurality of targeted advertisements from a plurality of advertisements stored in an advertisement content data store for the mobile device based on at least one of a plurality of rules, wherein the plurality of targeted advertisements comprises advertisements from at least two advertising campaigns of the plurality of advertising campaign;

storing, by an advertisement storage on the mobile device, the plurality of targeted advertisements delivered from the advertisement fulfillment system;

managing, by an advertisement management system on the mobile device, the advertisement storage to dynamically change which advertisement of the plurality of targeted advertisements is presented to a user based on at least one of the plurality of rules;

applying, by one of the advertisement fulfillment system and the advertisement management system, a higher priority rule of the plurality of rules;

breaking, by the one of the advertisement fulfillment system and the advertisement management system, a lower priority rule of the plurality of rules in response to applying the higher priority rule and changing a priority of one of the at least two advertising campaigns based on applying the higher priority rule; and presenting, by at least one executable application on the mobile device, the plurality of targeted advertisements to the user.

\* \* \* \* \*